US009052856B2

(12) United States Patent
Yamauchi et al.

(10) Patent No.: US 9,052,856 B2
(45) Date of Patent: Jun. 9, 2015

(54) IMAGE FORMING APPARATUS, JOB EXECUTION SYSTEM, AND JOB EXECUTION METHOD

(75) Inventors: Kana Yamauchi, Toyohashi (JP); Kaoru Fukuoka, Toyokawa (JP); Tomoyuki Atsumi, Toyohashi (JP); Hiroshi Sugiura, Hoi-gun (JP)

(73) Assignee: KONICA MINOLTA BUSINESS TECHNOLOGIES, INC., Chiyoda-Ku, Tokyo (JP)

( * ) Notice: Subject to any disclaimer, the term of this patent is extended or adjusted under 35 U.S.C. 154(b) by 1104 days.

(21) Appl. No.: 12/398,232

(22) Filed: Mar. 5, 2009

(65) Prior Publication Data

US 2009/0316189 A1 Dec. 24, 2009

(30) Foreign Application Priority Data

Jun. 18, 2008 (JP) ................................ 2008-159503

(51) Int. Cl.

| | |
|---|---|
| ***G06F 3/00*** | (2006.01) |
| ***G06F 21/60*** | (2013.01) |
| ***H04N 1/00*** | (2006.01) |
| *G06K 15/00* | (2006.01) |
| *G06F 3/12* | (2006.01) |

(52) U.S. Cl.

CPC ............ *G06F 3/1238* (2013.01); *G06F 21/608* (2013.01); *G06F 3/1222* (2013.01); *G06F 3/1288* (2013.01); *H04N 2201/3235* (2013.01); *H04N 1/00957* (2013.01)

(58) Field of Classification Search

CPC ... G06F 21/608; G06F 3/1237; G06F 3/1238; G06F 3/1222; G06F 3/1285; G06F 3/1288; H04N 1/00954; H04N 1/00957; H04L 29/06823; H04L 29/0685

USPC ......... 715/273–277, 700, 708, 710, 808, 809; 358/1.11–1.18, 400–404, 1.9, 2.1

See application file for complete search history.

(56) References Cited

U.S. PATENT DOCUMENTS

| | | | | |
|---|---|---|---|---|
| 7,684,064 | B2 * | 3/2010 | Kimura et al. | 358/1.14 |
| 7,804,752 | B2 * | 9/2010 | Weirauch | 369/53.28 |
| 7,817,291 | B2 * | 10/2010 | Ohmori | 358/1.14 |
| 7,865,725 | B2 * | 1/2011 | Choi | 713/166 |
| 2005/0105121 | A1 * | 5/2005 | Hirano | 358/1.14 |
| 2006/0274355 | A1 * | 12/2006 | Ferlitsch et al. | 358/1.15 |
| 2009/0174890 | A1 * | 7/2009 | Shigehisa et al. | 358/1.14 |

FOREIGN PATENT DOCUMENTS

| | | |
|---|---|---|
| JP | 2001-331234 | 11/2001 |
| JP | 2007166225 A * | 6/2007 |
| JP | 2007251634 A * | 9/2007 |

* cited by examiner

*Primary Examiner* — Chad Dickerson

(74) *Attorney, Agent, or Firm* — Buchanan Ingersoll & Rooney PC

(57) ABSTRACT

An image forming apparatus includes: a receiving portion that receives an authentication print job sent by a user; a comparison portion that compares identification information received through the user's input with identification information included in image data; a job execution portion that executes the authentication print job in the case where the comparison between the received identification information and the identification information included in the image data has succeeded; and a password storage portion that stores identification information in the case where the authentication print job is in the process of being received in order to enable the comparison made by the comparison portion with respect to the authentication print job that is being received.

9 Claims, 8 Drawing Sheets

2
23
PASSWORD STORAGE PORTION
HARD DISK
20d
PRINTING PORTION
20h
24
CONTROLLER
COMPARISON PORTION
241
JOB EXECUTION PORTION
242
RECEPTION DETERMINATION PORTION
243
RECEIVING PORTION
26
TERMINAL DEVICE
3
22
PASSWORD DB
OPERATION PANEL
DISPLAY PORTION
21
20f
COMMUNICATION PORTION
25
MANAGEMENT DEVICE
4

START
1
DISPLAY INPUT SCREEN
2
USER ID, PASSWORD INPUTTED?
No
Yes
3
IMAGE DATA TO COMPARE PRESENT?
No
Yes
4
LIST UP THAT IMAGE DATA
5
PRINT
6
PRINTING COMPLETED?
No
Yes
7
IMAGE DATA BEING RECEIVED?
No
Yes
8
STORE INPUTTED USER ID, PASSWORD
9
RECEPTION COMPLETE OR COMPARISON POSSIBLE?
No
Yes
10
IMAGE DATA CORRESPONDS WITH STORED USER ID, PASSWORD?
Yes
No

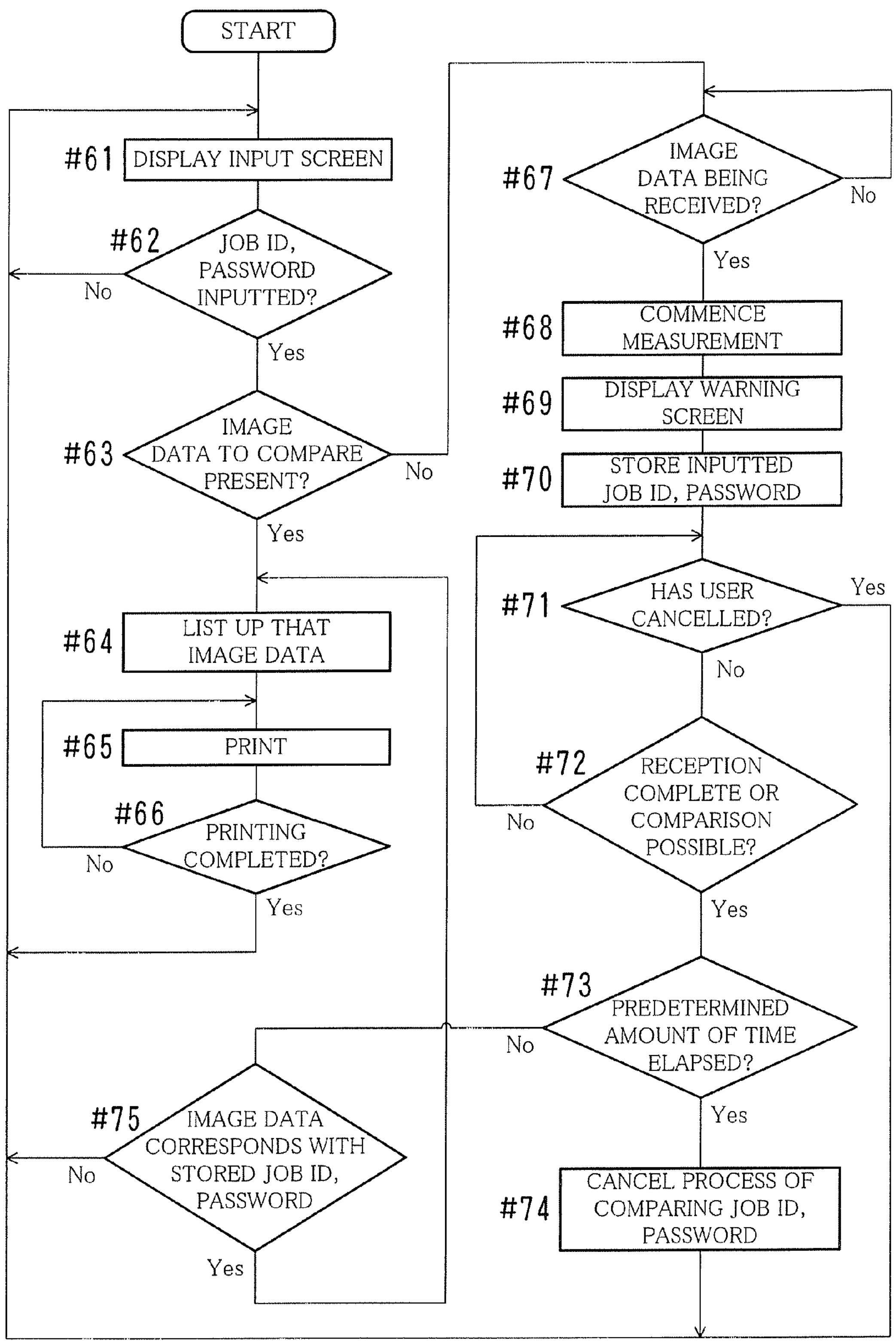
FIG. 8
START
61 DISPLAY INPUT SCREEN
62 JOB ID, PASSWORD INPUTTED?
No
Yes
63 IMAGE DATA TO COMPARE PRESENT?
No
Yes
64 LIST UP THAT IMAGE DATA
65 PRINT
66 PRINTING COMPLETED?
No
Yes
67 IMAGE DATA BEING RECEIVED?
No
Yes
68 COMMENCE MEASUREMENT
69 DISPLAY WARNING SCREEN
70 STORE INPUTTED JOB ID, PASSWORD
71 HAS USER CANCELLED?
Yes
No
72 RECEPTION COMPLETE OR COMPARISON POSSIBLE?
No
Yes
73 PREDETERMINED AMOUNT OF TIME ELAPSED?
No
Yes
74 CANCEL PROCESS OF COMPARING JOB ID, PASSWORD
75 IMAGE DATA CORRESPONDS WITH STORED JOB ID, PASSWORD
No
Yes

IMAGE FORMING APPARATUS, JOB EXECUTION SYSTEM, AND JOB EXECUTION METHOD

This application is based on Japanese patent application No. 2008-159503 filed on Jun. 18, 2008, the contents of which are hereby incorporated by reference.

BACKGROUND OF THE INVENTION

1. Field of the Invention

The present invention relates to an image forming apparatus such as an MFP, a job execution system, and a job execution method.

2. Description of the Related Art

In addition to image forming apparatuses that form images, such as copiers, printers, and facsimiles, multi-function devices called MFPs (Multi Function Peripherals) have conventionally been used in company offices and the like.

Recently, controlling information processing devices (i.e. personal computers) to operate only when an IC card has been inserted in the device has been proposed as a technique for preventing unauthorized access (see Japanese Patent Laid-Open No. 2001-331234).

A sensitive document printing method is an example of a method to which such a technique is applied. In this method, when an authentication print job has been sent to an image forming apparatus from a terminal device, the user that sent the job inputs a user ID and password using an operation panel of the image forming apparatus. If the authentication process is a success, the print output commences. Note that "authentication print job" refers to a print job that is executed when the user that sent the print job from a terminal device to an image forming apparatus has performed a predetermined authentication operation using an operation panel of the image forming apparatus and that authentication process has succeeded.

In addition to the case where the authentication process is executed by the user inputting a user ID and a password via an operation panel, there are also cases where the user performs a predetermined operation using an authentication apparatus, such as an IC card authentication apparatus or a finger vein authentication apparatus, thereby executing an authentication process. Furthermore, there are cases where the user performs authentication by inputting the job ID of the authentication print job along with a password, thereby executing the authentication print job.

However, the authentication process is not executed in the case where the user that sent the authentication print job performs a predetermined authentication operation using the image forming apparatus but the authentication print job has not yet been received, or in other words, is in the process of being received. For this reason, it is necessary for the user to wait for time to pass and then once again perform the authentication operation, which is extremely troublesome.

SUMMARY

Having been achieved in light of such problems, it is an object of the present invention to make it possible to perform print output with less trouble than is conventionally possible.

According to one aspect of the present invention, an image forming apparatus is configured to execute an authentication print job that is to be executed based on an authentication result. The image forming apparatus includes a receiving portion receiving the authentication print job sent by a user, an image data storage portion storing image data of the authentication print job, an accepting portion receiving first identification information, the first identification information being inputted by the user, a comparison portion performing comparison between the first identification information and second identification information, the second identification information being included in the image data stored in the image data storage portion, a job execution portion executing the authentication print job when the comparison has shown that the first identification information matches the second identification information, an identification information storage portion storing the first identification information, and a controller causing, when the authentication print job is being received by the receiving portion, the identification information storage portion to store the first identification information to enable the comparison portion to perform the comparison on the authentication print job that is being received.

Preferably, the identification information storage portion may store the first identification information until the receiving portion has completed reception of the authentication print job.

Further, the image forming apparatus may include a display portion displaying, when the authentication print job is being received by the receiving portion, a message indicating that the comparison portion repeats the comparison after completion of reception of the authentication print job.

BRIEF DESCRIPTION OF THE DRAWINGS

FIG. 8 is a flowchart illustrating yet another example of the flow of a job execution process according to an embodiment of the present invention.

DESCRIPTION OF THE PREFERRED EMBODIMENTS

The following describes a case in which an image forming apparatus, called an MFP or Multi Function Peripheral, which is a processing device that integrates a variety of functions, such as copying, scanning, faxing, network printing, document server functionality, is used.

Figure 1:
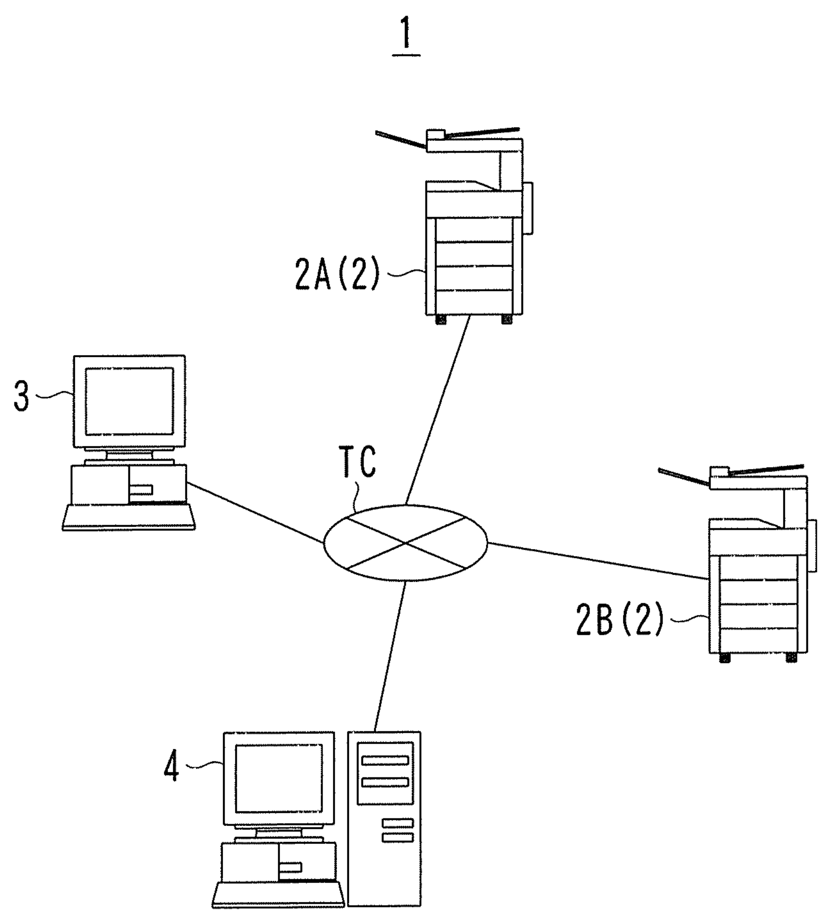
FIG. 1 is a diagram illustrating an example of the overall configuration of a job execution system.
Figure 2:
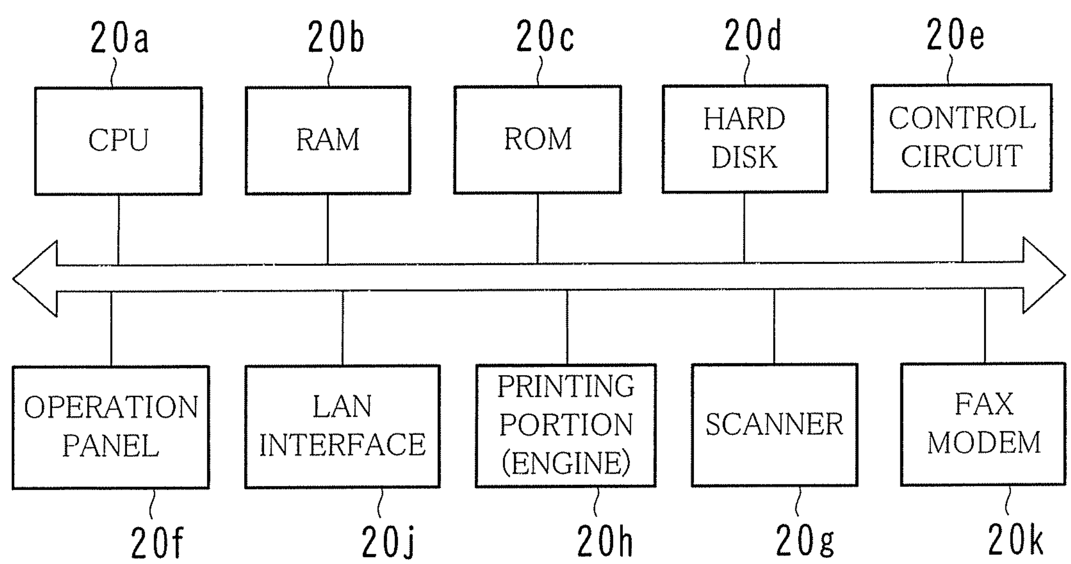
FIG. 2 is a diagram illustrating an example of the hardware configuration of an image forming apparatus.
Figure 3:
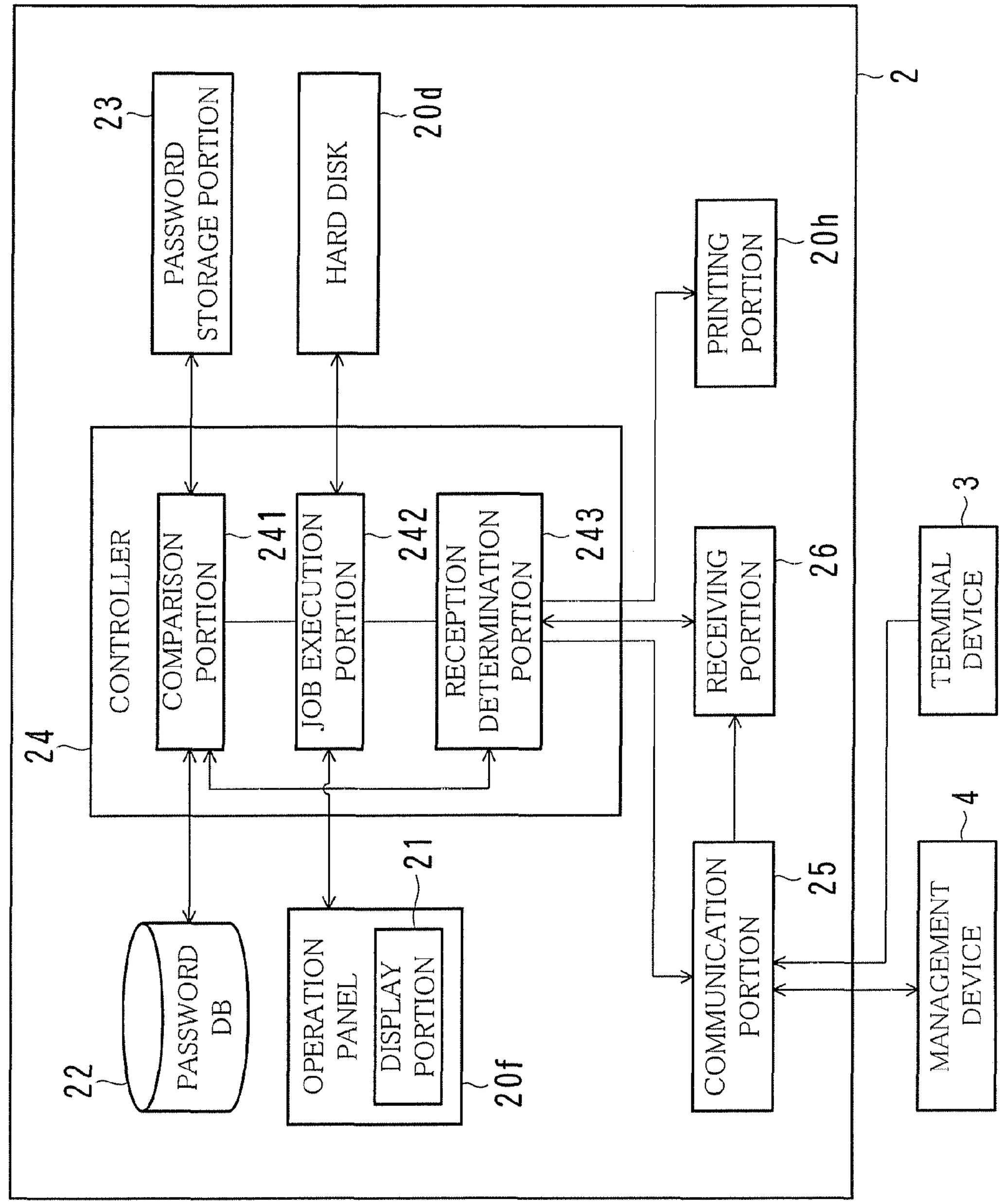
FIG. 3 is a diagram illustrating an example of the functional configuration of an image forming apparatus.
Figure 4:
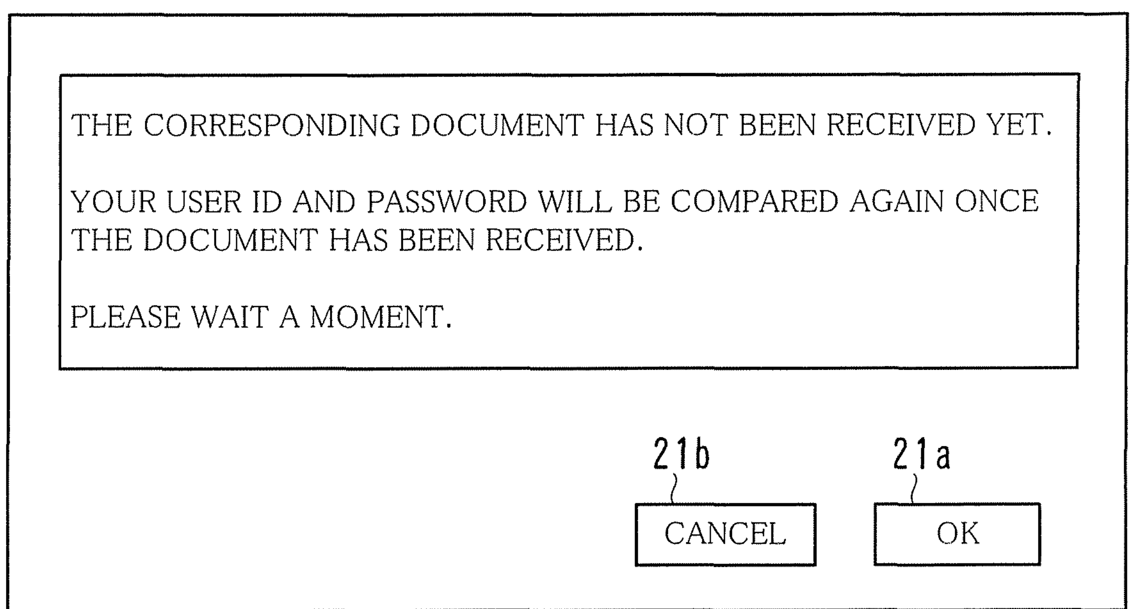
FIG. 4 is a diagram illustrating an example of a warning screen displayed in a display portion of an operation panel.

FIG. 1 is a diagram illustrating an example of the overall configuration of a job execution system 1; FIG. 2 is a diagram illustrating an example of the hardware configuration of an image forming apparatus 2; FIG. 3 is a diagram illustrating an example of the functional configuration of the image forming apparatus 2; and FIG. 4 is a diagram illustrating an example of a warning screen displayed in a display portion 21 of an operation panel **20*f*.**

As shown in FIG. 1, the job execution system 1 is configured of multiple image forming apparatuses 2 (2A, 2B, and so on), a terminal device 3, a management device (server) 4, a communication line TC, and so on. A LAN, the Internet, a public line, a dedicated line, or the like may be used as the communication line TC. In such a job execution system 1, the image forming apparatuses 2, the terminal device 3, and the management device 4 are connected to one another via the communication line TC.

The terminal device 3 is a client of the image forming apparatuses 2, and is a device for using scanner, fax, box, PC printing, and other functions provided by the image forming apparatuses 2.

Each image forming apparatus 2 can be installed in the office of a public body (a governmental body, a local authority, or the like) or a business, a public facility such as a school or a library, or in other locations, and can be shared by multiple users.

As shown in FIG. 2, each image forming apparatus 2 is configured of a CPU 20*a*, a RAM 20*b*, a ROM 20*c*, a hard disk 20*d*, a control circuit 20*e*, the operation panel 20*f*, a scanner 20*g*, a printing portion (engine) 20*h*, a LAN interface 20*j*, a fax modem 20*k*, and the like.

The control circuit 20*e* is a circuit for controlling the hard disk 20*d*, the operation panel 20*f*, the scanner 20*g*, the printing portion 20*h*, the LAN interface 20*j*, and the fax modem 20*k*.

The scanner 20*g* optically reads an image of content such as text, equations, symbols, photographs, diagrams, and illustrations written on a document, and generates image data thereof.

The printing portion 20*h* prints an image based on the image data obtained by the scanner 20*g* onto a recording medium such as paper.

The LAN interface 20*j* is a NIC (Network Interface Card) for communicating with other image forming apparatuses 2, and is used to connect the image forming apparatus 2 to a hub or a router.

The fax modem 20*k* is a device for communicating with another image forming apparatus 2, a fax terminal, or the like through a fax protocol.

The operation panel 20*f* is configured of the display portion 21, which is in turn configured of a touch panel-type liquid-crystal display and shall be described later, and an operation portion (not shown) configured of a numerical keypad and the like. A screen for providing messages, instructions, and the like to a user, a screen through which the user inputs his or her desired type of process and processing conditions, and a screen for displaying the results of processes executed by the CPU 20*a* and the like are examples of screens displayed in the display portion 21.

By operating the display portion 21 or the operation portion while viewing the abovementioned screens, the user can provide instructions to the image forming apparatus 2 to commence or stop the execution of processing, specify processing conditions such as the destination of data, printing conditions, or scanning conditions, and specify various other items. In other words, the operation panel 20*f* plays the role of a user interface by which the user operates the image forming apparatus 2.

As shown in FIG. 3, each image forming apparatus 2 is configured of a password database 22, a password storage portion 23, a controller 24, a communication portion 25, and a receiving portion 26. The controller 24 includes a comparison portion 241, a job execution portion 242, and a reception determination portion 243. These constituent elements are realized by the abovementioned CPU 20*a*, RAM 20*b*, ROM 20*c*, or other such circuit elements. A computer program for implementing the various functions of these constituent elements is stored in the RAM 20*b*, the ROM 20*c*, or the like.

First, the receiving portion 26 receives an authentication print job from the terminal device 3 via the communication portion 25. The authentication print job is a print job executed when the user that sent the print job (image data, print instructions, and so on) from the terminal device 3 to the image forming apparatus 2 has performed a predetermined authentication operation (inputting a user ID and password, a job ID and password, or the like) through the operation panel 20*f* or an authentication device such as a biometric authentication device provided in the image forming apparatus 2 and that authentication process has been successful.

The controller 24 stores the image data relating to the authentication print job received by the receiving portion 26 in the hard disk 20*d*.

Here, the image data relating to the authentication print job includes a user ID, which is user identification information, and a password. In other words, the user ID, password, and a body (main data) make up a single piece of image data. The user ID and password are embedded at the top of the image data, and the body is attached thereafter.

Therefore, the receiving portion 26 receives the user ID and password included in the image data sent from the terminal device 3 first, and then receives the body thereafter.

The controller 24 causes an input screen, for the user to input his or her user ID and password, to be displayed in the display portion 21.

The controller 24 then checks whether or not the user has inputted his or her user ID and password through the operation panel 20*f*. If the user ID and password have been inputted by the user, the comparison portion 241 determines whether or not the image data corresponding to the inputted user ID and password is stored in the hard disk 20*d*.

Then, if the image data corresponding to the inputted user ID and password is stored in the hard disk 20*d*, the job execution portion 242 causes the printing portion 20*h* to print an image based on that image data onto paper.

However, if image data corresponding to the inputted user ID and password is not yet stored in the hard disk 20*d*, the reception determination portion 243 checks whether or not the receiving portion 26 is in the process of receiving image data.

In the case where the receiving portion 26 is in the process of receiving image data, the controller 24 stores the user ID and password inputted by the user in the password database 22 and the password storage portion 23.

Furthermore, when the reception of image data by the receiving portion 26 has been completed, or when the user ID and password information included in image data has been received despite the receiving portion 26 being in the process of receiving that image data, the comparison portion 241 compares the user ID and password received by the receiving portion 26 with the user IDs and passwords stored in the password storage portion 23.

Here, as described above, because the receiving portion 26 receives the user ID and password included in the image data sent from the terminal device 3 prior to receiving the body, the comparison portion 241 can perform the comparison even if the image data has not been completely received by the receiving portion 26.

Note that in the present embodiment, image data is sent using PJL commands. PJL is a printing command language (developed by Hewlett Packard) that provides functionality for controlling print jobs that are being processed by a printing device. Through this, it can be understood that the sending of the user ID, password, and body has commenced, and thus it can also be understood that the reception of the user ID and password has been completed. The comparison portion 241 can therefore carry out the comparison.

In the case where the user ID and password received by the receiving portion 26 match a user ID and password stored in the password storage portion 23, the controller 24 causes the printing portion 20*h* to print an image based on the stated image data onto paper.

Here, in the case where the image data is in the process of being received, the controller 24 causes a message to be displayed in the display portion 21, indicating that the image data has not been completely received and that the user ID and password comparison will be performed again once the image data has been completely received; this message is illustrated in FIG. 4. In this case, the user presses an OK button 21*a* upon visually checking the display portion 21. However, in the case where the user does not wish to carry out the user ID and password comparison after the image data has been completely received by the receiving portion 26, s/he presses a cancel button 21*b*. Doing so cancels the authentication print job.

Figure 5:
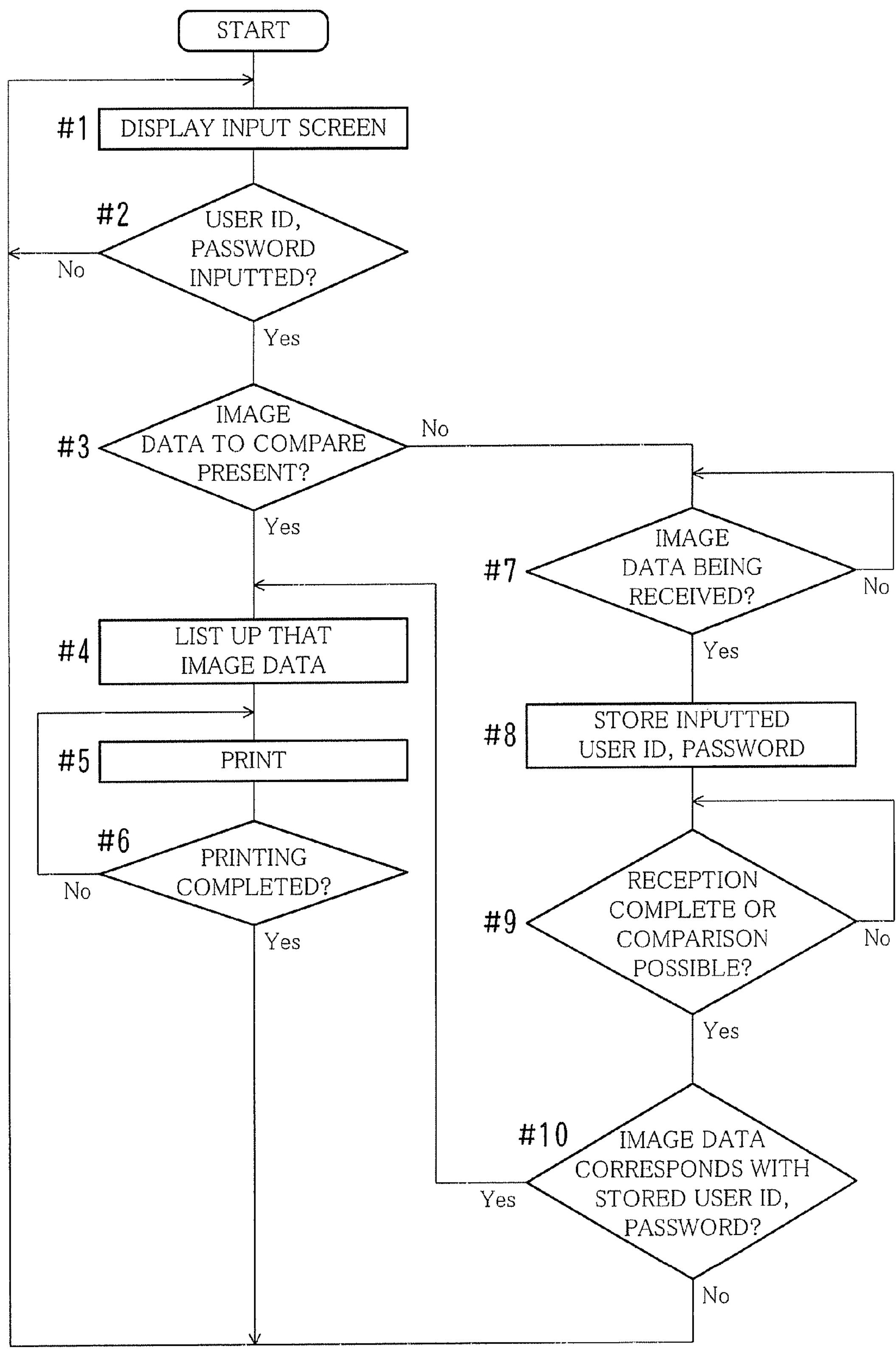
FIG. 5 is a flowchart illustrating an example of the flow of a job execution process according to an embodiment of the present invention.

FIG. 5 is a flowchart illustrating an example of the flow of a job execution process according to the present embodiment.

As shown in FIG. 5, first, the user ID and password input screen is displayed in the display portion 21 (#1). When a user ID and password have been inputted by the user (Yes in #2), it is determined whether or not image data corresponding to the inputted user ID and password is stored in the hard disk 20*d* (#3).

In the case where corresponding image data is stored in the hard disk 20*d* (Yes in #3), the target image data is listed up (#4), and images based on that image data are printed onto paper (#5). In the case where the printing is not complete (No in #6), the printing process of #5 is continued.

Meanwhile, in the case where corresponding image data is not stored in the hard disk 20*d* (No in #3), it is determined whether or not image data is in the process of being received (#7).

In the case where image data is in the process of being received (Yes in #7), the user ID and password inputted in #2 are stored (held) (#8).

Then, in the case where the reception of the image data has been completed or the apparatus has entered a state in which it is capable of comparison, or in other words, in the case where the user ID and password information included in the image data has been received (Yes in #9), it is determined whether or not the received image data corresponds to the user ID and password stored in #8 (#10).

In the case where the received image data corresponds (Yes in #10), the aforementioned processes of #4, #5, and #6 are executed. However, in the case where the received image data does not correspond (No in #10), the process returns to #1. Note that the process may also return to #7 after the process of #10 (No in #10), rather than returning to #1.

Figure 6:
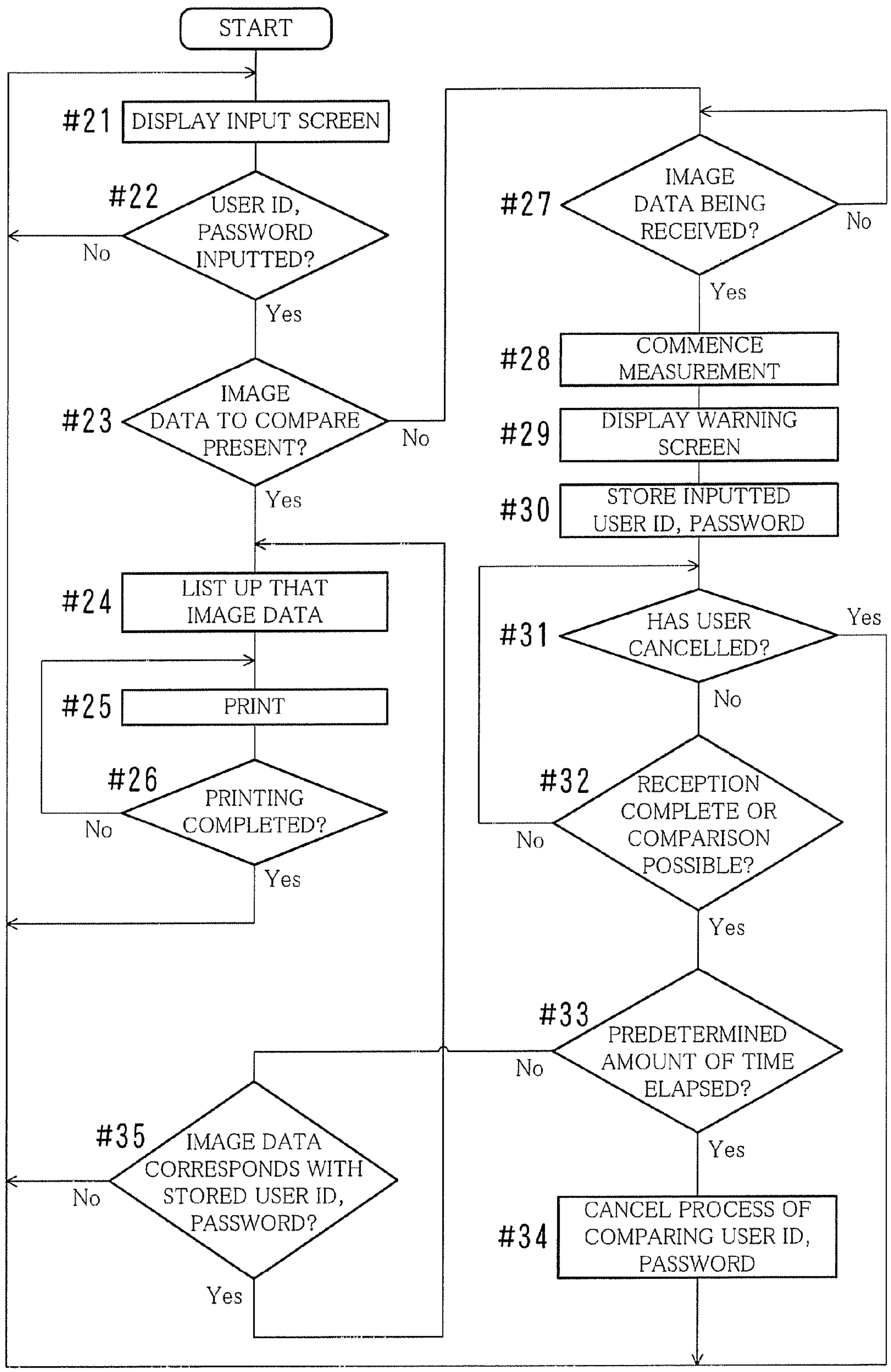
FIG. 6 is a flowchart illustrating another example of the flow of a job execution process according to an embodiment of the present invention.

FIG. 6 is a flowchart illustrating another example of the flow of a job execution process according to the present embodiment.

In FIG. 6, the processes of #21 to #26 are the same as the aforementioned processes of #1 to #6. In other words, first, the user ID and password input screen is displayed in the display portion 21 (#21). When a user ID and password have been inputted by the user (Yes in #22), it is determined whether or not image data corresponding to the inputted user ID and password is stored in the hard disk 20*d* (#23).

In the case where corresponding image data is stored in the hard disk 20*d* (Yes in #23), the target image data is listed up (#24), and images based on that image data are printed onto paper (#25). In the case where the printing is not complete (No in #26), the printing process of #25 is continued.

Meanwhile, in the case where corresponding image data is not stored in the hard disk 20*d* (No in #23), it is determined whether or not image data is in the process of being received (#27).

In the case where image data is in the process of being received (Yes in #27), the controller 24 begins measuring time (#28). The warning screen mentioned above with reference to FIG. 4 is then displayed in the display portion 21 (#29).

Next, the user ID and password inputted in #22 are stored (held) (#30).

Here, in the case where the cancel button 21*b* has been pressed by the user (Yes in #31), the process returns to #21. However, in the case where the cancel button 21*b* has not been pressed by the user (No in #31), it is determined whether or not the reception of the image data has been completed or the apparatus has entered a state in which it is capable of comparison, or in other words, if the user ID and password information included in the image data has been received (#32).

In the case where the image data has been completely received, or the case where the user ID and password information included in the image data has been received (Yes in #32), it is determined whether or not a predetermined amount of time has elapsed since the controller 24 commenced the measurement (#33).

In the case where the predetermined amount of time has elapsed since the controller 24 commenced the measurement (Yes in #33), the process for comparing the user ID and password is cancelled (#34), and the process returns to #21.

However, in the case where the predetermined amount of time has not elapsed since the controller 24 commenced the measurement (No in #33), it is determined whether or not the received image data corresponds to the user ID and password stored in #30 (#35).

In the case where the received image data corresponds (Yes in #35), the aforementioned processes of #24, #25, and #26 are executed. However, in the case where the received image data does not correspond (No in #35), the process returns to #21. Note that the process may also return to #27 after the process of #35 (No in #35), rather than returning to #21.

Effects of the Present Embodiment

In the present embodiment, even if, when the user that has sent an authentication print job from the terminal device 3 to the image forming apparatus 2 inputs his or her user ID and password using the operation panel 20*f*, the image forming apparatus 2 has not yet commenced the reception of the image data relating to that authentication print job, or the reception of that image data has not yet been completed, the inputted user ID and password information is not discarded. Instead, the inputted user ID and password are held (stored) until the comparable information included in the image data, or in other words, the user ID and password, are received. The comparison process is executed once again when the user ID and password can be received.

According to such a method, the user does not need to input his or her user ID and password again.

Therefore, in the case where the image data relating to an authentication print job has not yet been received when the user has performed a predetermined authentication operation, the print output can be carried out with less trouble than with the conventional method, in which the authentication information based on the authentication operation is discarded.

Furthermore, because it is not necessary to input the user ID and password again, the chance of the user sustaining mental stress such as annoyance or anxiety is lessened.

Other Embodiments

In the above embodiment, a user ID and password are inputted as identification information when performing an authentication process for an authentication print job. However, as described hereinafter, a job ID and password may be inputted as well.

Figure 7:
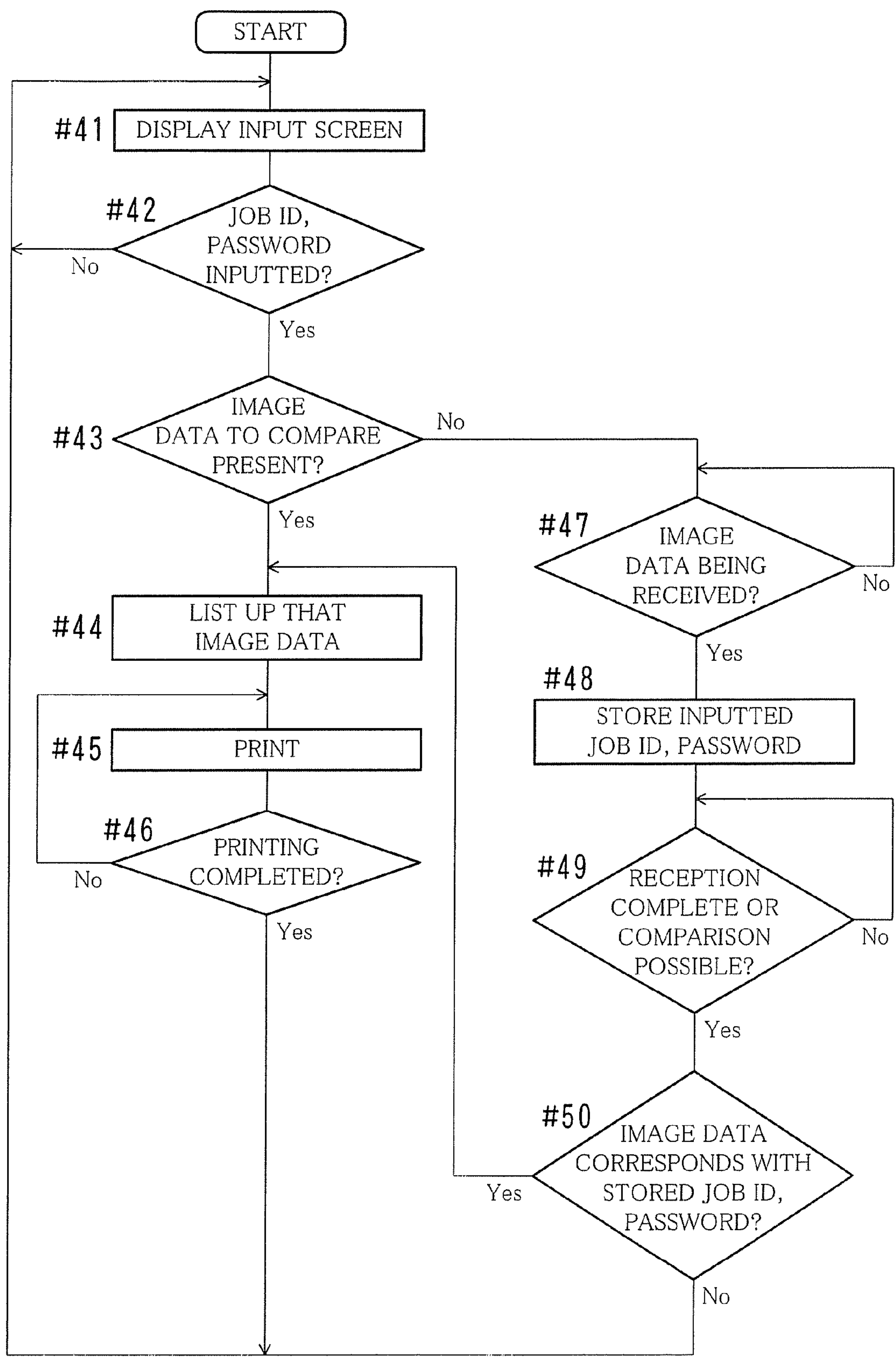
FIG. 7 is a flowchart illustrating yet another example of the flow of a job execution process according to an embodiment of the present invention.

FIG. 7 is a flowchart illustrating another example of the flow of a job execution process according to the present embodiment.

As shown in FIG. 7, a job ID and password input screen is displayed in the display portion 21 (#41). When a job ID and password have been inputted by the user (Yes in #42), it is determined whether or not image data corresponding to the inputted job ID and password is stored in the hard disk 20*d* (#43).

In the case where corresponding image data is stored in the hard disk 20*d* (Yes in #43), the target image data is listed up (#44), and images based on that image data are printed onto paper (#45). In the case where the printing is not complete (No in #46), the printing process of #45 is continued.

Meanwhile, in the case where corresponding image data is not stored in the hard disk 20*d* (No in #43), it is determined whether or not image data is in the process of being received (#47).

In the case where image data is in the process of being received (Yes in #47), the job ID and password inputted in #42 are stored (held) (#48).

Then, in the case where the reception of the image data has been completed or the apparatus has entered a state in which it is capable of comparison, or in other words, in the case where the job ID and password information included in the image data has been received (Yes in #49), it is determined whether or not the received image data corresponds to the job ID and password stored in #48 (#50).

In the case where the received image data corresponds (Yes in #50), the aforementioned processes of #44, #45, and #46 are executed. However, in the case where the received image data does not correspond (No in #50), the process returns to #41. Note that the process may also return to #47 after the process of #50 (No in #50), rather than returning to #41. Furthermore, although the image data listed up in the process of #44 may be printed as-is, it is also possible to first display that data in a screen and allow the user to select the data to print.

FIG. 8 is a flowchart illustrating another example of the flow of a job execution process according to the present embodiment.

In FIG. 8, the processes of #61 to #66 are the same as the aforementioned processes of #41 to #46. In other words, first, the job ID and password input screen is displayed in the display portion 21 (#61). When a job ID and password have been inputted by the user (Yes in #62), it is determined whether or not image data corresponding to the inputted job ID and password is stored in the hard disk 20*d* (#63).

In the case where corresponding image data is stored in the hard disk 20*d* (Yes in #63), the target image data is listed up (#64), and images based on that image data are printed onto paper (#65). In the case where the printing is not complete (No in #66), the printing process of #65 is continued.

Meanwhile, in the case where corresponding image data is not stored in the hard disk 20*d* (No in #63), it is determined whether or not image data is in the process of being received (#67).

In the case where image data is in the process of being received (Yes in #67), the controller 24 begins measuring time (#68). The warning screen mentioned above with reference to FIG. 4 is then displayed in the display portion 21 (#69).

Next, the job ID and password inputted in #62 are stored (held) (#70).

Here, in the case where the cancel button 21*b* has been pressed by the user (Yes in #71), the process returns to #61. However, in the case where the cancel button 21*b* has not been pressed by the user (No in #71), it is determined whether or not the reception of the image data has been completed or the apparatus has entered a state in which it is capable of comparison, or in other words, if the job ID and password information included in the image data has been received (#72).

In the case where the image data has been completely received, or the case where the job ID and password information included in the image data has been received (Yes in #72), it is determined whether or not a predetermined amount of time has elapsed since the controller 24 commenced the measurement (#73).

In the case where the predetermined amount of time has elapsed since the controller 24 commenced the measurement (Yes in #73), the process for comparing the job ID and password is cancelled (#74), and the process returns to #61.

However, in the case where the predetermined amount of time has not elapsed since the controller 24 commenced the measurement (No in #73), it is determined whether or not the received image data corresponds to the job ID and password stored in #70 (#75).

In the case where the received image data corresponds (Yes in #75), the aforementioned processes of #64, #65, and #66 are executed. However, in the case where the received image data does not correspond (No in #75), the process returns to #61. Note that the process may also return to #67 after the process of #75 (No in #75), rather than returning to #61.

Furthermore, although the above embodiment described a case where the image data corresponding to the user ID and password inputted by the user is stored in the hard disk 20*d* of the image forming apparatus 2, the image data may instead be stored in the management device 4.

In such a case, when a user ID and password have been inputted by the user, the controller 24 inquires with the management device 4 as to whether or not image data that can be compared with the user ID and password is present in the management device 4.

Then, in the case where image data that can be compared, or in other words, image data that includes a user ID and password, is present in the management device 4, the receiving portion 26 receives that image data from the management device 4.

If the received image data corresponds to the inputted user ID and password, the printing portion 20*h* prints images based on that image data onto paper.

However, in the case where image data that can be compared is not present in the management device 4, the controller 24 periodically makes the abovementioned inquiry to the management device 4. If image data that can be compared is stored in the management device 4, the receiving portion 26 receives that image data from the management device 4. If the received image data corresponds to the inputted user ID and password, the printing portion 20*h* prints images based on that image data onto paper.

Furthermore, although the comparison process is executed within the image forming apparatus 2 in the above embodiment, a password storage portion may be provided in the management device 4, and the comparison process may then be executed within the management device 4.

Further still, although the above embodiment describes a case where the predetermined authentication operation corresponds to the user input of a user ID and password using the operation panel 20*f*, an authentication device such as an IC card authentication device or a finger vein authentication device may be provided in the image forming apparatus 2, and the predetermined authentication operation may be performed using that authentication device.

Finally, in the case where the reception of the image data relating to the authentication print job has not been commenced at the point in time when the user has inputted a user ID and password, the user may be notified, via an email or the like, that the reception of the image data has commenced upon the reception of the image data commencing.

Note that the configuration, processing content, processing order, and so on of the image forming apparatus 2 in its entirety or the various constituent elements included therein may be altered as appropriate within the spirit of the present invention. The abovementioned unique and distinguished effects can be attained in such a case as well.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image forming apparatus configured to execute an authentication print job, the authentication print job to be executed based on an authentication result, the image forming apparatus comprising:

- a receiving portion receiving the authentication print job sent by a user;
- an image data storage portion storing image data included in the authentication print job;
- an accepting portion receiving first identification information, the first identification information being inputted by the user;
- a comparison portion performing comparison between the first identification information and second identification information, the second identification information being included in the image data stored in the image data storage portion;
- a job execution portion executing the authentication print job when the comparison has shown that the first identification information matches the second identification information;
- an identification information storage portion storing the first identification information;
- a controller causing, when the image data included in the authentication print job is being received by the receiving portion, the identification information storage portion to store the first identification information to enable the comparison portion to perform the comparison on the authentication print job that is being received; and
- a display portion displaying, when the authentication print job is being received by the receiving portion, a message indicating that the comparison portion will repeat the comparison after completion of reception of the authentication print job.

2. The image forming apparatus according to claim 1, further comprising a first cancellation portion canceling the repeat comparison by the comparison portion while the display portion displays the message.

3. The image forming apparatus according to claim 1, further comprising a second cancellation portion canceling the repeat comparison-by the comparison portion when a predetermined time has elapsed since the receiving portion started to receive the authentication print job.

4. A job execution system configured to execute an authentication print job, the authentication print job to be executed based on an authentication result, the job execution system comprising:

- a receiving portion receiving the authentication print job sent by a user;
- an image data storage portion storing image data included in the authentication print job;
- an accepting portion receiving first identification information, the first identification information being inputted by the user;
- a comparison portion performing comparison between the first identification information and second identification information, the second identification information being included in the image data stored in the image data storage portion;
- a job execution portion executing the authentication print job when the comparison has shown that the first identification information matches the second identification information;
- an identification information storage portion storing the first identification information;
- a controller causing, when the image data included in the authentication print job is being received by the receiving portion, the identification information storage portion to store the first identification information to enable the comparison portion to perform the comparison on the authentication print job that is being received; and
- a display portion displaying, when the authentication print job is being received by the receiving portion, a message indicating that the comparison portion will repeat the comparison after completion of reception of the authentication print job.

5. The job execution system according to claim 4, further comprising a first cancellation portion canceling the repeat comparison by the comparison portion while the display portion displays the message.

6. The job execution system according to claim 4, further comprising a second cancellation portion canceling the repeat comparison by the comparison portion when a predetermined time has elapsed since the receiving portion started to receive the authentication print job.

7. A job execution method configured to execute an authentication print job, the authentication print job to be executed based on an authentication result, the job execution method comprising:

- a receiving step of receiving the authentication print job sent by a user;
- an accepting step of receiving first identification information, the first identification information being inputted by the user;
- an identification information storage step of storing, when the image data included in the authentication print job is being received, the first identification information to enable comparison between the first identification information and second identification information, the second identification information being included in stored image data included in the authentication print job that is being received;

a comparison step of performing the comparison between the first identification information and the second identification information;

an execution step of executing the authentication print job when the comparison has shown that the first identification information matches the second identification information; and a display step of displaying, when the authentication print job is being received, a message indicating that the comparison will be repeated after completion of reception of the authentication print job.

8. The job execution method according to claim 7, further comprising a first cancellation step of canceling the repeat comparison while the message is displayed.

9. The job execution method according to claim 7, further comprising a second cancellation step of canceling the repeat comparison when a predetermined time has elapsed since the receiving step of receiving the authentication print job was started.

* * * * *